Patented May 8, 1945

2,375,230

UNITED STATES PATENT OFFICE 2,375,230

INK

Bernard L. Kline, Manhasset, N. Y., assignor to The Western Union Telegraph Company, New York, N. Y., a corporation of New York No Drawing. Application August 1, 1940, Serial No. 349,239

7 Claims. (Cl. 106—22)

This invention relates to inks, and more particularly to inks for saturating the inking members of type wheel printers, such as are used in printing telegraph apparatus, although the inks of the invention may be used effectively for other purposes, for instance, for impregnating inking ribbons, stamp pads, and like members. The novel methods of printing and the novel inks employed in obtaining the new results disclosed herein include subject matter divided out of copending application, Serial No. 642,323, filed November 11, 1932.

In printing telegraph systems, and other cases where printed characters are obtained by transfer of ink from an inking member to a printing member, as in a type wheel printer, or directly to the printing surface, as in the ordinary typewriter, a number of different mediums are used to receive the printed record, each of which presents a different kind of printing surface.

The present invention in one of its aspects aims to provide inks which are suitable, not only for printing on a wide variety of printing surfaces, but also inks which are specially adapted for transfer to surfaces which do not readily receive printed impressions. The principal ones of the mediums used to receive printed impressions in the order of their increasing interfacial tension with ordinary inks are (1) cloth; (2) ordinary untreated papers which have comparatively rough and porous surfaces; (3) parchment; (4) transparent pressed, regenerated or reconstituted cellulose in the form of tape or sheets; (5) a paper calendered under high temperature to render it transparent—this paper has a comparatively rough but non-porous surface; (6) transparent cellulose esters molded or formed into tape or sheets, the surfaces of which are microscopically smooth but which are resistant to wetting; and (7) oiled or waxed papers which are extremely resistant to wetting. The inks of this invention can be suited to the printing surface so that interfacial tension between the surface and the ink will give printed impressions free from mottling caused by gathering of the globules, or on the other hand, without excessive spreading due to too low an interfacial tension between the ink and the printing surface.

Since the surface characteristics of the materials named above as examples of common mediums used to receive printed records are widely divergent, it has been necessary heretofore to formulate a special ink for each surface.

One of the objects of the present invention is to produce inks which may be used satisfactorily for printing upon a large number of different kinds of surfaces.

Another and related object of the invention is to produce inks suited to the surface characteristics of special printing materials.

Still another object is to produce an improved ink for recording upon tapes which are resistant to wetting, such as cellulose or cellulose ester type.

A still further object is to produce an ink which is inexpensive, simple to manufacture, and which will not deteriorate with age.

The novel inks to be disclosed herein employ alcohol type solvents, containing hydroxyl radicals but containing no ester groups, as the vehicle carrying the coloring matter. This chemical class of materials is specially useful in compounding inks because it has excellent solvent properties for methyl violet and also because it possesses special optical properties. Inks compounded with these solvents appear to pass most of the wave length bands of visible light permitting the coloring matter to fulfill its function since the vehicle transmits both red and blue light. This is especially useful where printing is done on transparent materials which are to be used in stock quotation projectors and the like.

Therefore, still another object of the invention is to produce an ink capable of affording printed characters having more intense coloring than inks available prior to this invention.

Still another object is to provide an ink for type wheel printers using impregnated ink dispensing members, with which the dispensing members may be reimpregnated as often as desired, which will not dry on the dispensing member and which will not affect metal or rubber parts of the printer.

A still further object is to produce an ink which does not readily absorb moisture.

Other objects and advantages of the invention disclosed herein will appear in the following detailed description.

The inks heretofore developed for printing upon cellulose acetate tape depend upon the use of a solvent for the tape in the ink which enables the ink to wet the tape and therefore produce an impression thereon. This ink is not suitable for other types of tape, however, such as cellulose or paper, since the solvent has no action thereon. For such surfaces, variations in the viscosity of the ink to obtain a medium of tackiness has been depended upon. This necessitates the provision of an ink having a different degree of viscosity for each type of surface to be printed upon and such inks have not proven particularly satisfactory for printing upon materials which in general have a high interfacial tension, such as the cellulose or cellulose acetate tapes.

The ink mostly used in printing for ticker type wheels in the past consists of a mixture of alcohol and glycerine containing when new approximately 12% of methyl violet in solution. Methyl violet is a powerful aniline dye having the property of maintaining its shade even when diluted. However, only about 12% of the dye will go in the solution and since alcohol is very volatile even this percentage of dye does not stay long in the solution. Ink rollers impregnated with this ink must be used soon after preparation and are of relatively short life due to the evaporation of the alcohol and the consequent precipitation of some of the dye in the felt rollers. Such rollers cannot be reimpregnated since the precipitated dye renders them unfit for further use and will not be readily reabsorbed by any subsequent treatment.

Moreover, the glycerine used in the ink absorbs water from the air, changing the consistency of the ink and rendering the printing erratic and dependent upon humidity conditions. This ink is not very suitable for tapes of the cellulose of cellulose acetate type since the glycerine does not properly wet the surfaces thereof and consequently the printing is light and not satisfactory for projection purposes.

In accordance with the present invention a new principle of formulating inks is employed whereby inks are produced which print or write on all classes of printing mediums substantially equally well. In place of depending upon the viscosity of the ink or upon its dissolving effect on the receiving medium, I control the wetting of the tape by interfacial tension between the printing surface and the ink through regulation of the surface tension of the ink. I have found that if the surface tension of the ink is suited to the printing surface, the ink will wet all types of tape without dissolving them and will spread sufficiently to form uniform characters without mottling or spreading.

In carrying out the invention disclosed herein it is preferred to employ methyl violet as the primary coloring agent, due to the strong contrast afforded thereby, and to its relative cheapness, although it is to be understood that any other suitable aniline or other kind of dye or coloring matter may be employed for the production of inks of other colors.

In order to render the ink resistant to evaporation and thereby to enable impregnated rollers or ribbons to be stored for long periods, a solvent for the dye is preferred which has a high boiling point, preferably over 350° F.

The solvents which have been found most satisfactory as vehicles are organic solvents of the alcohol type and more particularly glycols and their corresponding ethers. These solvents have surface tensions ranging from about 15 dynes per centimeter to about 50 dynes per centimeter and many combinations of these solvents are possible to produce a suitable solvent having a surface tension between 25 and 30 dynes per centimeter. These materials in addition to having a high boiling point readily dissolve the aniline dyes, and many of these solvents have an extremely low surface tension, such as carbitol, butyl carbitol and amylene glycol. In order to make a satisfactory ink these are mixed with others having higher surface tensions, such as diethylene glycol and triethylene glycol. The surface tension of these latter compounds is high compared to that of the former group and by properly preparing the mixture, the surface tension most suitable for printing, under many conditions, may be obtained. After numerous mixtures were tried, it was found that best results for printing upon the mediums disclosed herein were obtained with a combination of butyl carbitol containing a proportion of both diethylene glycol and triethylene glycol. The wetting ability of the solvent is regulated primarily by dilution with diethylene glycol and the viscosity somewhat altered by the addition of the triethylene glycol.

Due to the high solubility of these materials for methyl violet, the dye content may be increased over that used in prior inks up to about 24%, thereby rendering the characters printed with the ink heavier and darker or more opaque. This is of particular advantage in connection with printing upon transparent mediums for projection upon a screen in enlarged characters.

Many of the organic solvents not embraced in the class of alcohol materials having a high boiling point and being free of ester groups appear to have the property of filtering light so as to reduce passage of reds in the neighborhood of 650 to 750 millimicrons. This appears to be so since methyl violet when carried by these non-alcohol type vehicles loses its red cast and appears bluish. The obvious effect of this apparent optical property of many of the solvents is to cause loss of opacity or contrast of the printed characters.

The high boiling solvents of the alcohol type apparently do not exert a refraction or absorption effect on the longer wave lengths of visible light inasmuch as inks compounded with methyl violet have a reddish cast and characters printed on a transparent material and projected on a screen are dark and contrasting to the human eye.

Tests made on these printed characters using a standard photocell produce substantial response in the photocell, indicating that substantial red is refracted into the photocell since the photocell is most responsive in this red range. Printed characters lacking this reddish cast, on the other hand, do not stimulate the photocell, indicating a deficiency in the red range. These observations taken with a photocell corroborate the visual effect.

Examples of satisfactory solvents of the class described are propylene glycol, dipropylene glycol, butylene glycol, amylene glycol, diethylene glycol, triethylene glycol, trimethylene glycol, tetramethylene glycol, tetraethylene glycol, carbitol (the monoethyl ether of diethylene glycol), and butyl carbitol (the monobutyl ether of diethylene glycol). Certain of these, such as carbitol (surface tension 28 dynes), butyl carbitol (24 dynes), and amylene glycol (17 dynes), may be used along with others having a higher surface tension, such as diethylene glycol (38 dynes) and triethylene glycol (34 dynes). Any of these materials may be used alone or in combination, depending on the class of surface to be printed upon.

In effect, this means that when the requirement is to print on oiled or waxed papers, carbitol, butyl carbitol, or amylene glycol are used alone. In printing on cellulose tape or surfaces of cellulose esters or on highly calendered papers, such as glassine, mixtures of these materials are made with other solvents of higher surface tension to increase the final surface tension to between 25 and 30 dynes per centimeter.

When ordinary paper is required to be printed upon, the use of low surface tension solvents will produce spreading or feathering of the characters and for this reason solvents or mixtures having surface tensions between 25 and 35 dynes will produce best results. For the most highly absorbent surfaces, such as cloth or low sized paper, surface tensions even above 40 dynes are most suitable.

Due to the high solubility of these materials for methyl violet, the dye content may be increased over that used in prior inks, up to about 24%, thereby rendering the characters printed with the ink heavier and darker or more opaque. This is of particular advantage in connection with printing upon transparent mediums for projection upon a screen in enlarged characters.

The formula found most satisfactory for purple ink is as follows:

| | Per cent |
|---|---|
| Butyl carbitol | 34.3 |
| Diethylene glycol | 26.4 |
| Triethylene glycol | 15.3 |
| Methyl violet | 24.0 |

If a darker ink is desired, it may be obtained by mixing another aniline dye with the methyl violet. This has the effect of rendering the purple color of this latter dye dirty and hence darker in color. Chrysoidine Y, an orange-yellow dye, is particularly effective for this purpose, serving when added in the proper proportion, of toning the ink to a dark or dirty purple which has the property of seeming almost black and which, unlike ordinary blacks, does not gray or give the impression of fading out when the type wheel is lightly inked. This effect may be enhanced by adding a small proportion of malachite green to the other two dyes.

Obviously, any other mixture of dyes may be used either to produce a near black ink or to obtain any desired color effects. The preferred formula when using the methyl violet and chrysoidine Y color mixture is as follows:

| | Per cent |
|---|---|
| Butyl carbitol | 39.4 |
| Diethylene glycol | 25.7 |
| Triethylene glycol | 10.9 |
| Methyl violet | 13.7 |
| Chrysoidine Y | 6.5 |
| Malachite green | 3.8 |

As stated, this ink, due to its low surface tension, wets not only the plain papers and those calendered under high temperature and pressure to render them transparent, but also the cellulose and cellulose acetate tapes, thereby enabling printing to be effected equally well on all surfaces and permitting the inking rollers for all machines to be impregnated uniformly and therefore requiring but a single stock.

When printing upon a porous medium, such as ordinary paper, the ink of the formula just given is substantially non-smudging since, due to its low surface tension, it penetrates into the paper very rapidly. On the aforementioned calendered papers as well as on the cellulose tapes, both of which have relatively rough surfaces, the ink flows freely into the depressions of the paper, beneath the type, forming a continuous impression as distinguished from the mottled effect produced by the more viscous inks, due to the fact that they rest mainly on the high spots of the paper or tape.

The cellulose acetate tape presents one of the most difficult surfaces to print upon since this material is very resistant to wetting. However, due to the low surface tension of the ink there is a low interfacial tension produced between the ink and the tape, causing the ink to flow evenly and to wet all portions of the tape in contact with the type wheel. The characters produced on this material are solid and clean cut, and due to the high dye content of the ink they are dark and opaque, rendering the printing particularly suitable for projection upon a screen.

The untreated paper, of course, wets quite easily, whereas the resistance of wetting of the aforementioned calendered paper or the cellulose tape is intermediate that of the untreated paper and the cellulose acetate tape. The surface tension of the ink should be regulated so that it just wets the rough and porous surface of the untreated paper satisfactorily, having sufficient viscosity, however, so as not to spread unduly on the cellulose acetate. The surface tension of the ink, for satisfactorily wetting of all the surfaces described, should range from about 25 to 30 dynes per centimeter at room temperature, the most favorable action of all mediums being obtained with a surface tension of approximately 27 dynes per centimeter.

Butyl carbitol has a surface tension of about 24 dynes per centimeter. The diethylene glycol, having a surface tension of about 38 dynes per centimeter, is added in proper proportion to increase the surface tension to the desired value. Triethylene glycol, having a surface tension of about 34 dynes per centimeter, may also be used to control the surface tension of the ink solvent. The viscosity of this latter solvent is somewhat greater than that of diethylene glycol, and I have found that the best results are obtained by using a mixture of diethylene glycol and triethylene glycol, thereby regulating both the surface tension and the viscosity of the ink.

As a matter of comparison the usual alcohol glycerine vehicle used heretofore for inks for type wheel printers, when new has a surface tension of around 40 dynes per centimeter. The alcohol evaporates very rapidly, however, so that the proportion of alcohol and glycerine changes, and since glycerine has a relatively high surface tension of around 63.5 dynes per centimeter, the surface tension of the ink gradually increases during use and is normally much higher than 40. This ink does not depend upon surface tension for its printing quality but upon its viscosity, and it is not suitable except for printing upon plain paper, or similar surfaces.

It is to be understood that the range of surface tension specified is for an ink having the property of wetting or printing upon a large number of surfaces having widely differing characteristics, that is, for a universal ink. For specific surfaces surface tension outside of the range specified may be preferred, and therefore I do not desire to be limited to the specific range given, the same being specified merely as a guide to assist in the practice of the invention. When the proper conditions of surface tension are met as specified above, the ink will produce good impressions on all surfaces of an intermediate nature, and it may be used both for impregnating the usual felt inking rollers or ribbons for type bar machines, and it may be used for writing with pen upon such surfaces. The ink is sufficiently fluid so that it may be used in fountain pens, or automatic syphon recording devices.

The method of compounding the ink is comparatively simple, since it requires no grinding or extensive mechanical mixing of the ingredients. The solvents are first mixed in the proper proportions by weight in a flat bottomed metal container having a capacity about double the amount of ink being made. Preferably the depth of the container should be about three-quarters of its diameter or the length of one side. The solvents are then heated by applying the heat uniformly over the bottom of the vessel, to a temperature of about 140° to 150° F., which temperature is maintained through the process. The required amount of dye (which is in powder form) is added slowly to the heated solvents with constant stirring by means of a wooden paddle or wooden rod until all the dye has been added and all of the lumps or settlings have been dissolved. The ink is then complete and may be used for impregnating the rollers or it may be cooled and stored for later use.

While heating of the ink during manufacture is preferred, since it enables solution to take place more rapidly, equally good results may be produced by stirring only, at room temperature.

The rollers to be impregnated are placed on their sides in a single layer in a wire basket of a size to fit the ink container, the basket being lowered into the ink while the latter is heated to about 140° to 150° F., until the rollers are not more than one-half submerged. Complete submerging of the rollers will trap the air in the felt and prevent complete impregnation. The ink is allowed to soak up through the felt and wooden bobbins on which the felt is mounted, until no clean unimpregnated areas are left. This will require from two to six minutes with rollers of ordinary size, depending upon the temperature. The rollers are then quickly submerged for an instant and then removed from the ink and permitted to drain after which they are allowed to cool. They are then ready for use.

Since the solvents used in the ink have a high boiling point, they do not evaporate from the rollers and therefore the concentration thereof does not change, nor does the dye precipitate out of the solution. However, the ink does not absorb as much water from the air as do glycerine inks and consequently its consistency remains substantially constant in all kinds of weather. The rollers therefore may be stored for long periods of time without deteriorating and as fast as the ink is used up therefrom they may be impregnated over and over until they are rendered unfit for use due to wear.

The ink after it has been stored may be prepared for use again, by merely warming to 140° to 150° F. with constant stirring.

While I have specified certain solvents, other compounds of the chemical class disclosed which dissolve a sufficient quantity of the dye and have the requisite high boiling point, low surface tension, optical properties, and non-corrosive action on the printer parts, may be employed. Therefore, I do not desire to be limited to the specific formulas given herein but contemplate the use of all equivalent ingredients therein as coming within the scope of the appended claims.

What is claimed is:

1. A subtantially non-volatile ink comprising a dye dissolved in a mixture of two or more organic alcohol type solvents of the class consisting of glycols and glycol ethers each having a boiling point of at least 350° F. said solvents respectively having different surface tension characteristics and different boiling points, and the proportions of the solvents being such that said mixture has a surface tension of the order of between 25 and 30 dynes per centimeter and a boiling point above 350° F.

2. A substantially non-volatile ink comprising a dye dissolved in a mixture of two or more organic alcohol type solvents of the class consisting of ethylene glycols and their ethers each having a boiling point of at least 350° F., said solvents respectively having different surface tension characteristics and different boiling points, and the proportions of the solvents being such that said mixture has a surface tension of the order of between 25 and 30 dynes per centimeter and a boiling point above 350° F.

3. A substantially non-volatile ink comprising a dye dissolved in a mixture of butyl carbitol, diethylene glycol and triethylene glycol, the proportions of said solvents being such that said mixture has a surface tension of the order of between 25 and 30 dynes per centimeter.

4. A substantially non-volatile fluid ink comprising methyl violet dissolved in a mixture of butyl carbitol and a glycol, the proportions of said solvents being such that the mixture has a surface tension of the order of between 25 dynes and 40 dynes per centimeter.

5. An ink comprising a dye dissolved in a mixture of butyl carbitol, diethylene glycol, and triethylene glycol, the proportions of said solvents being such that the mixture has a surface tension of the order of between 25 dynes and 40 dynes per centimeter.

6. An ink having the following formula:

| | Per cent |
|---|---|
| Butyl carbitol | Approximately 34.3 |
| Diethylene glycol | do 26.4 |
| Triethylene glycol | do 15.3 |
| Soluble dye | do 24.0 |

7. A printing ink comprising by weight from 32.5% to 34.5% approximately of butyl carbitol, diethylene glycol 22.5% to 50%, triethylene glycol 9.5% to 14.5%, and an aniline dye, from 10% to 33.5%.

BERNARD L. KLINE.